(12) United States Patent
Greaves et al.

(10) Patent No.: US 7,558,985 B2
(45) Date of Patent: Jul. 7, 2009

(54) HIGH-EFFICIENCY TIME-SERIES ARCHIVAL SYSTEM FOR TELEMETRY SIGNALS

(75) Inventors: Jon D. Greaves, Longmont, CO (US); Keith A. Whisnant, La Jolla, CA (US); Kenny C. Gross, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 416 days.

(21) Appl. No.: 11/353,559

(22) Filed: Feb. 13, 2006

(65) Prior Publication Data

US 2007/0226554 A1 Sep. 27, 2007

(51) Int. Cl.
*G06F 11/00* (2006.01)
(52) U.S. Cl. .................................................. 714/37
(58) Field of Classification Search ............... None
See application file for complete search history.

(56) References Cited

U.S. PATENT DOCUMENTS 5,764,509 A 6/1998 Gross et al.

2002/0178207 A1 11/2002 McNeil
2002/0183971 A1 12/2002 Wegerich et al.
2004/0078723 A1 4/2004 Gross et al.

OTHER PUBLICATIONS

U.S. Appl. No. 11/195,565, filed Aug. 2, 2005, Gross et al.

*Primary Examiner*—Michael C Maskulinski
(74) *Attorney, Agent, or Firm*—Dorsey & Whitney LLP

(57) ABSTRACT

In one embodiment, a method and apparatus for high-efficiency time-series archiving for computer server telemetry signals is disclosed. The method includes selecting one or more telemetry signals of a plurality of telemetry signals by a sequential probability ratio test (SPRT) algorithm, the SPRT algorithm identifying the one or more telemetry signals as not consistent with normal behavior of the plurality of telemetry signals, injecting synthetic samples around the selected one or more telemetry signals to create a continuous time series telemetry sample, and analyzing the continuous time series telemetry sample to identify leading indicators of faults in the target. Other embodiments are also disclosed.

17 Claims, 5 Drawing Sheets

HIGH-EFFICIENCY TIME-SERIES ARCHIVAL SYSTEM FOR TELEMETRY SIGNALS

FIELD OF INVENTION

An embodiment of the invention relates to telemetry signal collection, and more specifically, to a high-efficiency time-series archival system for telemetry signals.

BACKGROUND OF INVENTION

Presently, physical and logical sensors are used in components, such as servers, to monitor performance of the component. Data from these sensors is known as telemetry data. The telemetry data is collected and analyzed. Archiving collected telemetry data into a data warehouse allows for application of intelligent data mining techniques to discover trends in the data. This is particularly useful for discovering leading indicators of software errors or hardware faults of applications or devices before they interrupt availability or performance of the applications or devices.

Many types of telemetry signals are episodic in nature. On the one hand, there is some normal "background" variation level that is not particularly interesting. On the other hand, there are episodes of interesting events that may be characterized by elevated levels, an increased burstiness, the appearance of a trend or growth rate in signals that are otherwise stationary (in the statistical sense), or the appearance of dynamic phenomena that distinguish the interesting events from the normal background variation levels.

Executing an effective data mining strategy on collected telemetry signals requires a rich set of telemetry signals to analyze. Yet, it is generally not known beforehand the subset of telemetry signals that is needed, for example, to identify a potential failure mode. It is not practical to store each sample from all telemetry signals across all monitored machines. This requires large amounts of storage that may not be reasonable or realistic.

Conventional approaches of archiving data simply store all data points monitored by the sensors on the components. In the case of other "event" data, the agent originating the alarm may have a predefined fixed threshold that signifies what is "interesting" versus "uninteresting" samples. "Interesting" samples refer to the data that is truly indicative of an abnormal event occurring at the component. "Uninteresting" samples refer to the data that is in line with the normal behavior of the component. In order to distinguish interesting vs. uninteresting samples, the sample is archived (and thus classified as "interesting") if the sample exceeds a pre-determined threshold. Yet, this approach suffers from two limitations.

First, it is difficult to decide where to set the threshold. For noisy processes, if the threshold is set too low, then frequent "false alarms" occur. A false alarm in this case is deciding to archive data that is, in fact, uninteresting. Thresholds may be set higher to avoid false alarms, but this leads to the possibility that interesting activity will be missed.

Second, archived data may include gaps during the uninteresting times. Most pattern recognition techniques that analyze time series data require uniformly sampled signals. Currently, there are no consumer processes of time series data that can analyze multiple signals with disparate gaps in their signatures.

A technique to capture "interesting" samples with greater statistical confidence, thereby significantly reducing storage requirements, while maintaining compatibility with legacy pattern recognition applications would be beneficial.

SUMMARY OF INVENTION

The present invention includes novel methods and apparatus for high-efficiency time-series archiving for computer server telemetry signals.

According to one embodiment of the invention, a method is disclosed. The method includes selecting one or more telemetry signals of a plurality of telemetry signals by a sequential probability ratio test (SPRT) algorithm, the SPRT algorithm identifying the one or more telemetry signals as not consistent with normal behavior of the plurality of telemetry signals, injecting synthetic samples around the selected one or more telemetry signals to create a continuous time series telemetry sample, and analyzing the continuous time series telemetry sample to identify leading indicators of faults in the target.

According to another embodiment of the invention, an apparatus is disclosed. The apparatus includes a sensor in a target to generate a plurality of telemetry signals representing a performance metric of the target, and an analysis component to receive one or more telemetry signals of the plurality of telemetry signals in order to inject synthetic samples around the selected one or more telemetry signals to create a continuous time series telemetry sample. In addition, a sequential probability ratio test (SPRT) algorithm is applied to the plurality of telemetry signals to identify the one or more telemetry signals, the one or more telemetry signals being inconsistent with normal behavior of the plurality of telemetry signals.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
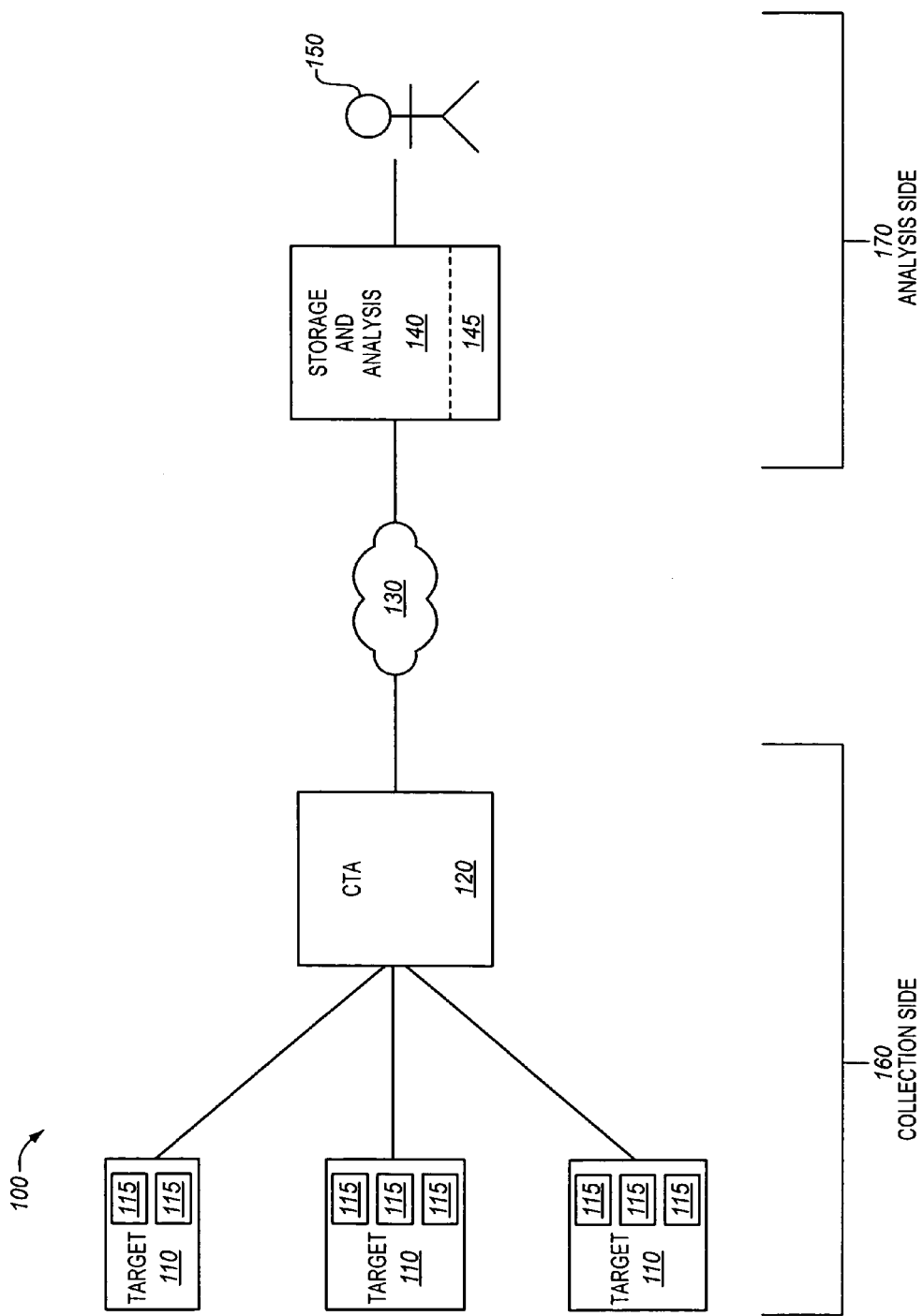
FIG. 1 is a block diagram of one embodiment of a telemetry signal collection and analysis system.

A method and apparatus are described for high-efficiency time-series archiving for telemetry signals. According to one embodiment, the method includes selecting one or more telemetry signals of a plurality of telemetry signals by a sequential probability ratio test (SPRT) algorithm, the SPRT algorithm identifying the one or more telemetry signals as not consistent with normal behavior of the plurality of telemetry signals, injecting synthetic samples around the selected one or more telemetry signals to create a continuous time series telemetry sample, and analyzing the continuous time series telemetry sample to identify leading indicators of faults in the target.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table).

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Embodiments of the invention introduce a novel method to implement high-efficiency time-series archiving for telemetry signals. FIG. 1 is a block diagram illustrating a telemetry signal collection and analysis system 100 that performs embodiments of the present invention. System 100 includes a collection side 160 and an analysis side 170. The collection side 160 includes a plurality of targets 110 and a control tower appliance (CTA) 120. The analysis side 170 includes a storage and analysis component 140 and an end user 150. In some embodiments, the collection side 160 and the analysis side 170 are connected through the Internet 130.

In some embodiments, the targets 110 may be servers. In other embodiments, the targets 110 may be other components that telemetry signals are collected from. Each target 110 further includes one or more sensors 115 to collect telemetry data from the target 110. The sensors 115 may monitor and collect telemetry data on statistics from the targets including temperature, voltage currents, and other performance metrics which affect the performance of the target 110. One skilled in the art will appreciate that there are a variety of performance indicators that may be measured by sensors 115. In some embodiments, the sensors 115 may be implemented with hardware, firmware, and/or software components.

In one embodiment, CTA 120 is a middleware component that may run separately from targets 110. In general, the CTA 120 may be any general computing device that runs software.

In some embodiments, CTA 120 may collect the sensor 115 telemetry data from the targets 110. In one embodiment, CTA 120 is physically located in the same collection side 160 network as the targets 110. The data collected by CTA 120 may be delivered through the Internet 130 to a storage and analysis component 140 on the analysis side 170. In one embodiment, the analysis side 170 network may be located at a site of an organization that seeks to analyze the telemetry data to determine trends or anomalies in the data. In one embodiment, the storage and analysis component 140 may include an interface 145 for an end user 150 to interact with to analyze the telemetry data received from the collection side 160.

In many cases, the amount of sensors 115 may number up to the hundreds for a single target 110. If this number of sensors 115 is included in each target 110 of many targets 110, then an unmanageable amount of data can result. This data would create a bottleneck if sent to the analysis side 170 through limited bandwidth the Internet 130 may provide. Furthermore, the storage required for this amount of data on the analysis side 170 may be unrealistic, if not impossible. Embodiments of the invention provide a way for system 100 to decide which telemetry samples to archive and which telemetry samples to discard on the collection side 160 of the system 100.

Figure 2:
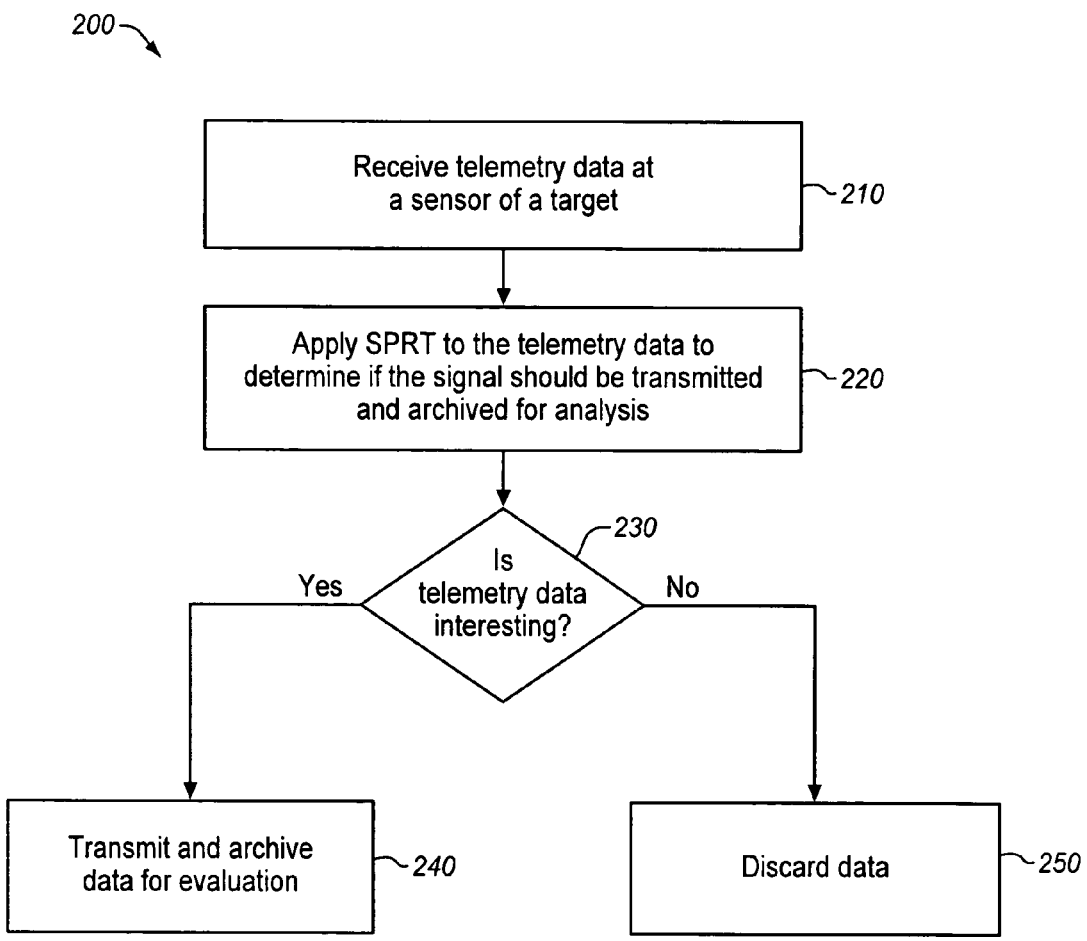
FIG. 2 is a flow diagram illustrating a method of one embodiment of the invention.

FIG. 2 is a flow diagram of a method of collecting telemetry data according to one embodiment of the invention. In one embodiment, process 200 is performed on the collection side 160 of system 100. Process 200 begins at processing block 210 where telemetry data is received at a sensor of a target. Then, at processing block 220, instead of using a fixed threshold to decide when to save samples from telemetry data, a sequential detection algorithm called the Sequential Probability Ratio Test (SPRT) is applied to the telemetry data. The SPRT decides when the telemetry signal is "interesting." In one embodiment, the determination of "interesting" may include having its samples come from (1) a distribution with higher or lower mean, or (2) a distribution with larger or smaller levels of variability than normal.

In some embodiments, it is envisioned that the SPRT algorithm may be implemented as software, firmware, hardware, or some combination of the three. In addition, in one embodiment, the SPRT algorithm may be implemented at the target where the sensor is located. In another embodiment, the SPRT algorithm may be implemented at a CTA to which the target is connected. The particular implemented location of the SPRT algorithm depends on the intelligence and processing capability of the component in which the SPRT algorithm is to be implemented. Different circumstances and processing capabilities may dictate the SPRT algorithm's specific implementation. However, it should be noted that implementing the SPRT algorithm on the collection side of a system where telemetry data is being collected assists in compressing the amount of data to be eventually transmitted and stored, thereby bringing both performance and storage gains.

At decision block 230, it is determined whether the SPRT algorithm found the telemetry data "interesting" or not. If the data is interesting, then at processing block 240, the telemetry data is transmitted to an analysis component for evaluation. This evaluation may take place at a later time when enough interesting data has been collected. If the SPRT algorithm determines that the telemetry data is not interesting, then the data is discarded and not stored at processing block 250.

Using the SPRT algorithm on the collection side brings, but is not limited to, the following advantages: (1) The SPRT may include user-configurable false-alarm and missed-alarm probabilities (as opposed to threshold limits, which have a "see-saw" tradeoff between sensitivity and false alarms); and (2) the SPRT has the mathematically shortest decision time for catching subtle anomalies in noisy process variables.

Although one skilled in the art should have a basic understanding of the SPRT algorithm, the following description provides further details to implement one embodiment of a SPRT algorithm, such as may be used in process 200 described with respect to FIG. 2. The SPRT algorithm is a statistical hypothesis test that differs from standard fixed sample tests in the way in which statistical observations are employed. In familiar fixed-sample statistical tests, a given number of observations are used to select one hypothesis from one or more alternative hypotheses. The SPRT, however, examines one observation at a time, then makes a decision as soon as it has sufficient information to ensure that pre-specified confidence bounds are met.

In other words, the SPRT algorithm is a binary hypothesis test that analyzes process observations sequentially to determine whether or not the signal is consistent with normal behavior. When the SPRT reaches a decision about current process behavior, i.e., that the signal is behaving normally or abnormally, the decision is reported and the test continues to process observations.

The basic approach taken by the SPRT technique is to analyze successive observations of a discrete process. For example, let $y_n$ represent a sample from the discrete process at a given moment, $t_n$, in time. Assume for simplicity of illustration that the sequence of values $\{Y_n\}=y_0, y_1 \ldots y_n$ comes from a stationary process characterized by a Gaussian, white-noise probability density function (PDF) with mean 0. (Note that since a nominally stationary process is being dealt with here, any process variables with a nonzero mean may be first normalized to a mean of zero with no loss of generality).

For each of six types of tandem SPRT tests developed in this explanation, normal process behavior is defined to be that for which the signal data adheres to a Gaussian PDF with mean 0 and variance $\sigma^2$. Normal signal behavior is referred to as the null hypothesis, $H_0$. The six specific SPRT hypothesis tests that are formulated are computed in parallel for each telemetry signal. Although some embodiments of the invention are described in terms of applying a SPRT that applies to Gaussian time series, it is also possible to use a nonparametric SPRT for signals that do not adhere to a Gaussian distribution.

Within a SPRT surveillance module, all six tandem hypothesis tests are executed in parallel. Each test determines whether the current sequence of process observations is consistent with the null hypothesis vs. an alternative hypothesis. Four of the six tests include the positive mean test (SPRT 1), the negative mean test (SPRT 2), the nominal variance test (SPRT 3), and the inverse variance test (SPRT 4). For the positive mean test, the corresponding alternative hypothesis, $H_1$, is that the signal data adhere to a Gaussian PDF with mean +M and variance $\sigma^2$. For the negative mean test, the corresponding alternative hypothesis, $H_2$, is that the signal data adheres to a Gaussian PDF with mean −M and variance $\sigma^2$. For the nominal variance test, the corresponding alternative hypothesis, $H_3$, is that the signal data adheres to a Gaussian PDF with mean 0 and variance V$\sigma^2$ (with scalar factor V). For the inverse variance test, the corresponding alternative hypothesis, $H_4$, is that the data adheres to a Gaussian PDF with mean 0 and variance $\sigma^2$/V.

The final two tandem SPRT tests (SPRTs 5 and 6) are performed not on the raw telemetry signal as above, but on the first difference function of the signal. For discrete time series, the first difference function (i.e., difference between each observation and the observation preceding it) gives an estimate of the numerical derivative of the time series. During uninteresting time periods, the observations in the first difference function will be a nominally stationary random process centered about zero, which is in concert with the assumptions in employing a SPRT.

If an upward or downward trend should suddenly appear in the signal, SPRTs 5 and 6 monitor for an increase or decrease, respectively, in the slope of the signal. As such, if there is a decrease in the value of the signal, SPRT alarms will be triggered for SPRTs 2 and 6. SPRT 2 will fire a warning because the sequence of raw observations is dropping with time. In addition, SPRT 6 will fire because the slope of the signal changes from zero to something less than zero. The advantage of monitoring the mean SPRT and slope SPRT in tandem is realized if the signal levels off to a new stationary value (or plateau). At this point, SPRT 2 will continue firing (because the new current value is different from the value prior to the degradation), whereas the alarms from SPRT 6 will cease (because the slope returns to zero when the raw signal reaches a plateau).

If SPRTs 3 or 4 should fire a warning, it means that the variance of the telemetry signal is increasing or decreasing, respectively. An increasing variance that is not accompanied by a change in mean (inferred from SPRTs 1 & 2 and SPRTs 5 & 6) can signify an episodic event that is "bursty" or "spiky" with time. A decreasing variance that is not accompanied by a change in mean is a common symptom of a failing sensor that is characterized by an increasing time constant. As such, having variance SPRTs available in parallel with slope and mean SPRTs can provide a wealth of supplementary diagnostic information that has not been possible with conventional data sampling techniques.

The above-described SPRT technique provides a quantitative framework that permits a decision to be made between the null hypothesis and the foregoing six alternative hypotheses with specified misidentification probabilities. If the SPRT accepts one of the alternative hypotheses, an alarm flag is set and data is archived. If all six of the null hypotheses are met, it can be concluded with a high degree of confidence that the data represents normal background activity.

Figure 3:
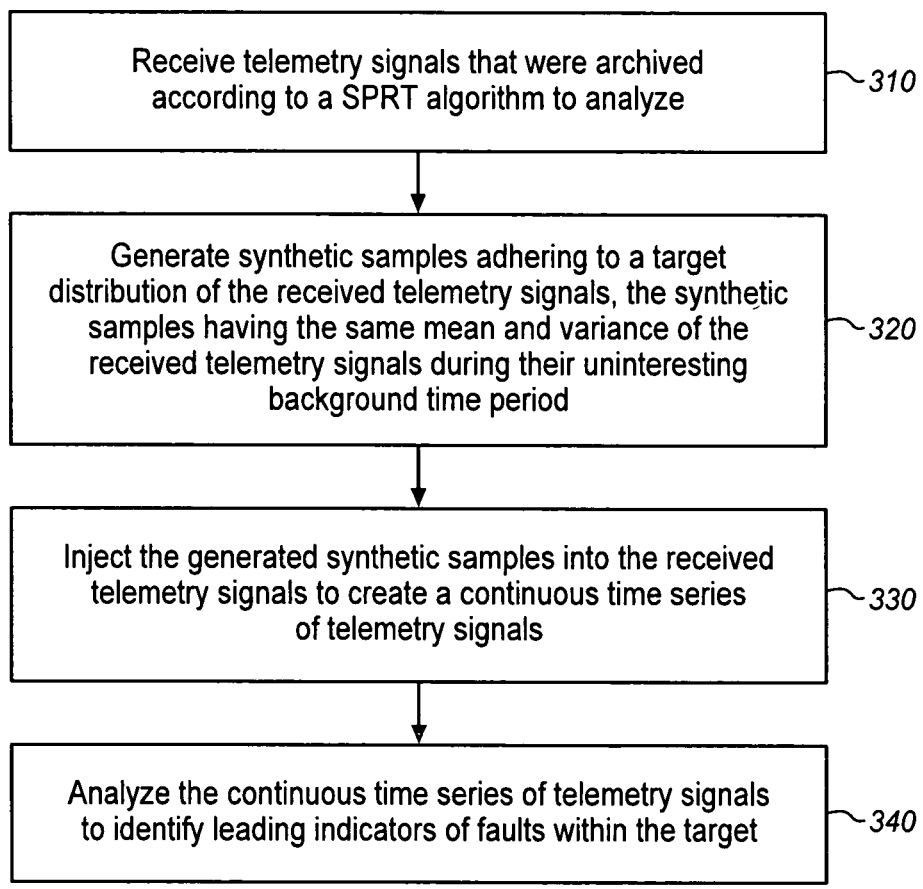
FIG. 3 is a flow diagram illustrating a method according to another embodiment of the invention.

FIG. 3 is a flow diagram illustrating a method in accordance with another embodiment of the invention. As a result of the collection process described with respect to FIG. 2, the telemetry signals that are archived may have large gaps during which the uninteresting signal content is not saved to storage. When it comes time to analyze the signals, these gaps should be filled to make the telemetry signals appear as if they were continuously sampled and archived. In this manner, the samples may be analyzed by legacy pattern recognition applications requiring a continuous sample.

Process 300 provides a technique to present a continuous time series of sampled telemetry data to the analysis side of a system. In one embodiment, process 300 is performed by the analysis side 170 of system 100 described with respect to FIG. 1. Process 300 begins at processing block 310 where telemetry signals archived according to a SPRT algorithm are received at an analysis side of a telemetry collection system. In one embodiment, the telemetry signals were collected and archived according to process 200 described with respect to FIG. 2.

At processing block 320, synthetic samples are generated that adhere to the target distribution of the archived telemetry signals. In one embodiment, the target synthetically-generated signals have the same mean and variance as the telemetry signals being monitored during the uninteresting background time period. By definition, the data characteristics are less interesting during this time period, so that synthesis of an approximation to background activity is adequate and, most importantly, supplies synchronous observations so that legacy data mining techniques may be used by consumers of the time series signal. In some embodiments, the target distribution defaults to being white Gaussian noise. In other embodiments, it is possible to customize the distribution for applications where the expected background activity is not Gaussian.

At processing block 330, the generated synthetic sample is injected into the received, archived telemetry signals in order to create a continuous time series telemetry data sample that can be analyzed by legacy pattern recognition applications and data mining techniques. Finally, at processing block 340, the continuous time series telemetry signal may be analyzed to identify leading indicators of faults in the target. For example, the analysis may be accomplished via a pattern recognition application, a data mining technique, or by presentation to a user as a graphical representation.

Intuitively, the strategy of process 300 leverages the observation that background activity carries very little information content. Instead of storing samples with little information content, these samples are reconstructed at analysis time using simulated data that statistically mimics the uninteresting data discarded on the collection side. Because the data are statistically equivalent, the analysis processes are unaware that the information content was synthetically generated, and the outputs of the analysis processes are the same had the original uninteresting data been used.

Embodiments of the invention revolve around the application of the SPRT algorithm. The SPRT algorithm defines both what the expected distribution of the data looks like (the uninteresting time periods that are subsequently reconstructed during analysis) and what an "interesting" time period looks like (the actual data collected). The present application of the SPRT algorithm in embodiments of the invention is novel and unique because it is not being used to monitor and look for variable changes, as it had been utilized in the past. Rather, it is used for data compression, and in so doing provides value in terms of storage savings and improved performance.

Figure 4:
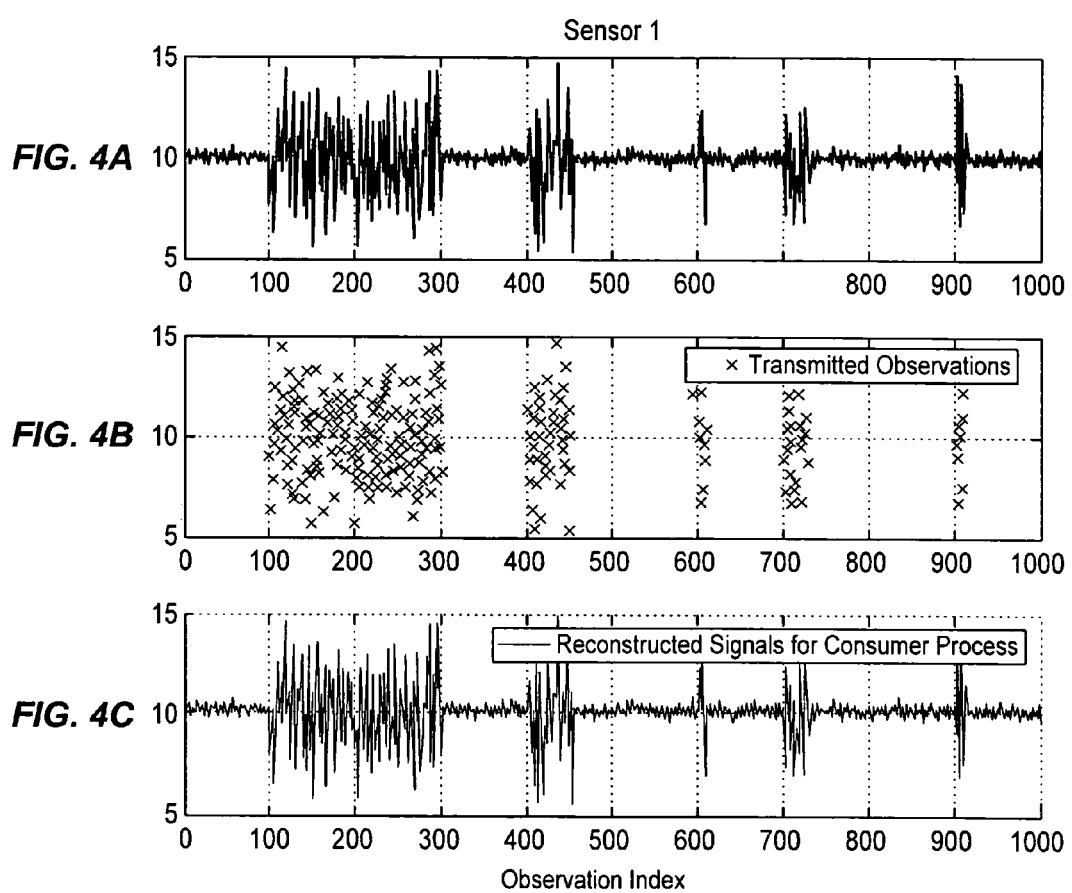
FIGS. 4A-4C are graphical representations of an application of an embodiment of the invention.

FIGS. 4A through 4C are graphical representations of the application of embodiments of the present invention. In one embodiment, FIGS. 4A through 4C represent the application of the techniques presented with respect to FIGS. 1-3. FIG. 4A shows original raw data as seen by sensors in a target, such as sensors 115 in target 110 described with respect to FIG. 1. The raw data is continuous real-time data that is being monitored. With prior conventional approaches, all of the data shown would be archived continuously using precious storage space, even during the less interesting "background activity" periods that can be seen in the figure.

FIG. 4B shows the "interesting" data that is selected on the collection side according to a SPRT algorithm to be archived, such as described in the various embodiments of the invention. For example, process 200 described with respect to FIG. 2 may provide the results of FIG. 4B. The SPRT algorithm determines the "interesting" episodes of activity on the sensors. As can be seen, the distribution is significantly different from the distribution of the "background activity."

FIG. 4C shows the reconstructed signals on the analysis side per embodiments of the present invention. Background activity is synthetically generated by, for example, process 300 described with respect to FIG. 3. The background activity in the reconstructed signals is statistically indistinguishable from the background activity in the raw signals shown in FIG. 4A (i.e., matches in mean and variance). The optimized reconstructed signals may be synchronously sampled and are amenable to analysis by legacy pattern recognition algorithms.

Figure 5:
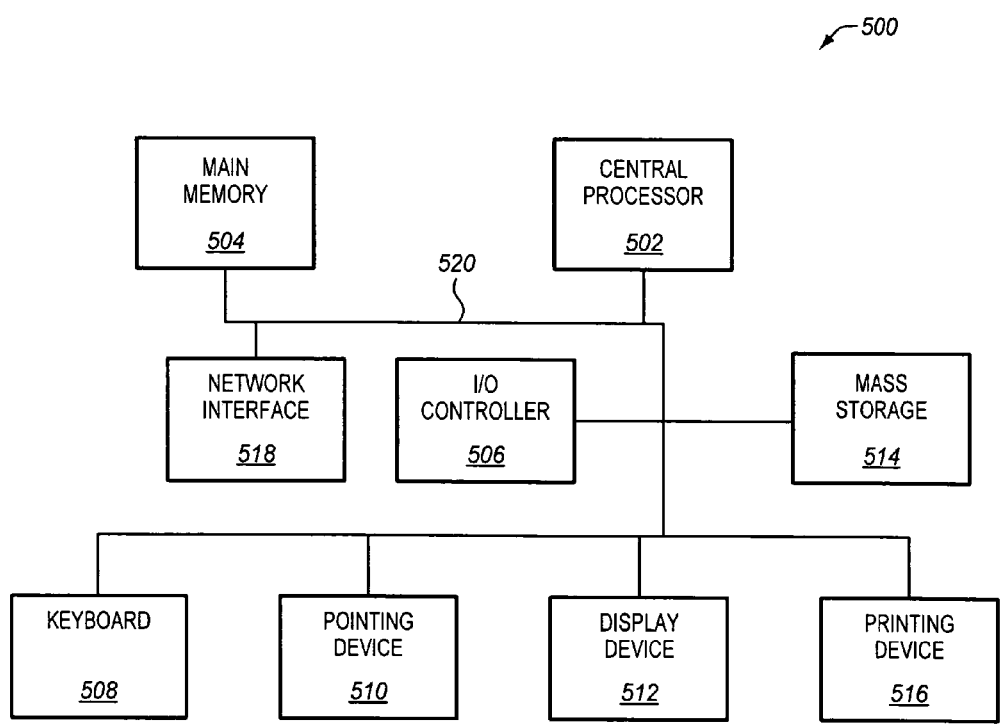
FIG. 5 is an illustration of an embodiment of a computer system.

FIG. 5 illustrates an exemplary computer system 500 in which certain embodiments of the present invention may be implemented. In one embodiment, the components of FIG. 1, such as targets 110, CTA 120, or storage and analysis component 140, may be implemented as system 500 or as components of system 500.

System 500 comprises a central processor 502, a main memory 504, an input/output (I/O) controller 506, a keyboard 508, a pointing device 510 (e.g., mouse, track ball, pen device, or the like), a display device 512, a mass storage 514 (e.g., a nonvolatile storage such as a hard disk, an optical drive, and the like), and a network interface 518. Additional input/output devices, such as a printing device 516, may be included in the system 500 as desired. As illustrated, the various components of the system 500 communicate through a system bus 520 or similar architecture.

In a further embodiment, system 500 may be a distributed computing system. In other words, one or more of the various components of the system 500 may be located in a physically separate location than the other components of the system 500. Such components may be accessed and connected via a network to the other components In accordance with an embodiment of the present invention, the computer system 500 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.).

Also, instead of a single processor, two or more processors (whether on a single chip or on separate chips) can be utilized to provide speedup in operations. It is further envisioned that the processor 502 may be a complex instruction set computer (CISC) microprocessor, a reduced instruction set computing (RISC) microprocessor, a very long instruction word (VLIW) microprocessor, a processor implementing a combination of instruction sets, and the like.

The network interface 518 provides communication capability with other computer systems on a same local network, on a different network connected via modems and the like to the present network, or to other computers across the Internet. In various embodiments of the present invention, the network interface 518 can be implemented utilizing technologies including, but not limited to, Ethernet, Fast Ethernet, Gigabit Ethernet (such as that covered by the Institute of Electrical and Electronics Engineers (IEEE) 801.1 standard), wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, wireless networks (such as those implemented by utilizing the wireless application protocol (WAP)), time division multiplexing (TDM), universal serial bus (USB and its varieties such as USB II), asynchronous transfer mode (ATM), satellite, cable modem, and/or FireWire.

Moreover, the computer system 500 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 500 is a general purpose computer capable of running any number of applications such as those available from companies including Oracle, Siebel, Unisys, Microsoft, and the like.

Embodiments of the invention allow an individual or an organization to archive a rich stream of telemetry data for future analysis, including large-scale intelligent data mining. Without this proposed technique, a decision would have to be made before deploying telemetry collection agents as to which telemetry signals are worth saving and which telemetry signals can be discarded. Once discarded, the data is lost forever; moreover, it is not realistic that all possible analysis and data mining applications can be anticipated before deploying telemetry collection agents. So, the decisions as to what data to save have a significant impact on the effectiveness of future analyses. Embodiments of the invention give significant latitude in collecting a wide variety of telemetry signals without wasting storage space for time periods that are known to be uninteresting, while capturing very richly detailed observations during episodic periods when interesting events are occurring.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
    selecting one or more telemetry signals of a plurality of telemetry signals by a sequential probability ratio test (SPRT) algorithm, the SPRT algorithm identifying the one or more telemetry signals as not consistent with normal behavior of the plurality of telemetry signals, wherein a control tower appliance connected to a target performs the SPRT algorithm to select the one or more telemetry signals;
    injecting synthetic samples around the selected one or more telemetry signals to create a continuous time series telemetry sample; and
    analyzing the continuous time series telemetry sample to identify leading indicators of faults in the target.

2. The method of claim 1, further comprising archiving the selected one or more telemetry signals for later injecting and analyzing.

3. The method of claim 1, wherein a sensor in the target collects the plurality of telemetry signals to be selected by the SPRT algorithm.

4. The method of claim 3, wherein the target is a server.

5. The method of claim 3, wherein the target performs the SPRT algorithm to select the one or more telemetry signals.

6. The method of claim 1, wherein the normal behavior is based on a distribution of the plurality of telemetry signals with an average mean, and wherein the SPRT algorithm selects the one or more telemetry signals if they have at least one of a higher or a lower mean than the average mean.

7. The method of claim 1, wherein the normal behavior is based on a distribution of the plurality of telemetry signals with an average variability, and wherein the SPRT algorithm selects the one or more telemetry signals if they have at least one of a larger or a smaller variability than the average variability.

8. The method of claim 1, wherein the synthetic samples are generated to adhere to a target distribution of the plurality of telemetry signals, the target distribution having a same mean and a same variance as the plurality of telemetry signals that were not selected.

9. An article of manufacture, comprising a machine-accessible medium including data that, when accessed by a machine, cause the machine to perform operations comprising:
    selecting one or more telemetry signals of a plurality of telemetry signals by a sequential probability ratio test (SPRT) algorithm, the SPRT algorithm identifying the one or more telemetry signals as not consistent with normal behavior of the plurality of telemetry signals, wherein a control tower appliance connected to a target performs the SPRT algorithm to select the one or more telemetry signals;
    injecting synthetic samples around the selected one or more telemetry signals to create a continuous time series telemetry sample; and
    analyzing the continuous time series telemetry sample with at least one of pattern recognition technique, a data mining technique, and a graphical representation to identify leading indicators of faults in the target.

10. The article of manufacture of claim 9, wherein a sensor in the target collects the plurality of telemetry signals to be selected by the SPRT algorithm.

11. The article of manufacture of claim 9, wherein the target performs the SPRT algorithm to select the one or more telemetry signals.

12. The article of manufacture of claim 9, wherein the synthetic samples are generated to adhere to a target distribution of the plurality of telemetry signals, the target distribution having a same mean and a same variance as the plurality of telemetry signals that were not selected.

13. An apparatus, comprising:
    a sensor in a target to generate a plurality of telemetry signals representing a performance metric of the target;
    an analysis component to receive one or more telemetry signals of the plurality of telemetry signals in order to inject synthetic samples around the selected one or more telemetry signals to create a continuous time series telemetry sample;
    wherein a sequential probability ratio test (SPRT) algorithm is applied to the plurality of telemetry signals to identify the one or more telemetry signals, the one or more telemetry signals being inconsistent with normal behavior of the plurality of telemetry signals, and wherein a control tower connected to the target is to apply the SPRT algorithm to the plurality of telemetry signals received from the target and is to transmit the one or more telemetry signals to the analysis component.

14. The apparatus of claim 13, wherein the target to apply the SPRT algorithm to the plurality of telemetry signals and to transmit the identified one or more telemetry signals to the control tower appliance.

15. The apparatus of claim 13, wherein the normal behavior is based on a distribution of the plurality of telemetry signals with an average mean, and wherein the SPRT algorithm selects the one or more telemetry signals if they have at least one of a higher or a lower mean than the average mean.

16. The apparatus of claim 13, wherein the normal behavior is based on a distribution of the plurality of telemetry signals with an average variability, and wherein the SPRT algorithm selects the one or more telemetry signals if they have at least one of a larger or a smaller variability than the average variability.

17. The apparatus of claim 13, wherein the synthetic samples are generated to adhere to a target distribution of the plurality of telemetry signals, the target distribution having a same mean and a same variance as the plurality of telemetry signals that were not selected.

* * * * *